United States Patent
Barbaresi

(10) Patent No.: US 7,929,153 B2
(45) Date of Patent: Apr. 19, 2011

(54) DEVICE FOR ACQUIRING A THREE-DIMENSIONAL VIDEO CONSTITUTED BY 3-D FRAMES WHICH CONTAIN THE SHAPE AND COLOR OF THE ACQUIRED BODY

(76) Inventor: Abramo Barbaresi, Senigallia (IT)

( * ) Notice: Subject to any disclaimer, the term of this patent is extended or adjusted under 35 U.S.C. 154(b) by 243 days.

(21) Appl. No.: 12/227,635

(22) PCT Filed: May 23, 2007

(86) PCT No.: PCT/EP2007/004576
§ 371 (c)(1),
(2), (4) Date: Nov. 24, 2008

(87) PCT Pub. No.: WO2007/137746
PCT Pub. Date: Dec. 6, 2007

(65) Prior Publication Data
US 2009/0262367 A1    Oct. 22, 2009

(30) Foreign Application Priority Data
May 30, 2006 (IT) .................................. BO06A0421

(51) Int. Cl.
*G01B 11/24* (2006.01)
(52) U.S. Cl. ......................................................... 356/612
(58) Field of Classification Search .................. 356/610, 356/612
See application file for complete search history.

(56) References Cited

U.S. PATENT DOCUMENTS

| | | | | |
|---|---|---|---|---|
| 5,581,352 A | * | 12/1996 | Zeien | 356/604 |
| 7,400,413 B2 | * | 7/2008 | Jeon et al. | 356/605 |
| 2003/0223083 A1 | | 12/2003 | Geng | |
| 2004/0021053 A1 | * | 2/2004 | Nielson et al. | 250/201.2 |
| 2005/0122529 A1 | * | 6/2005 | Kim et al. | 356/503 |
| 2007/0115484 A1 | * | 5/2007 | Huang et al. | 356/604 |

FOREIGN PATENT DOCUMENTS

| | | |
|---|---|---|
| DE | 44 16 108 A1 | 11/1995 |
| EP | 0 262 089 A | 3/1988 |
| WO | WO 96/27115 A | 9/1996 |

* cited by examiner

*Primary Examiner* — Roy Punnoose
(74) *Attorney, Agent, or Firm* — Modiano & Associati; Daniel O'Byrne; Albert Josif

(57) ABSTRACT

A device for acquiring the three-dimensional shape of the surface of an object comprises a lens; deflection means; at least two masks; at least two projection assemblies adapted to emit light beams which, by passing through the masks and the deflection means and by traveling along a channel which passes through the lens, strike the object to be acquired, projecting onto it the mutually offset images of the masks; means for acquiring the images reflected by the object; and means for processing the reflected images. The deflection means are semireflecting and the masks are adapted to project fringe images of the cosinusoidal type through the deflection means.

18 Claims, 7 Drawing Sheets

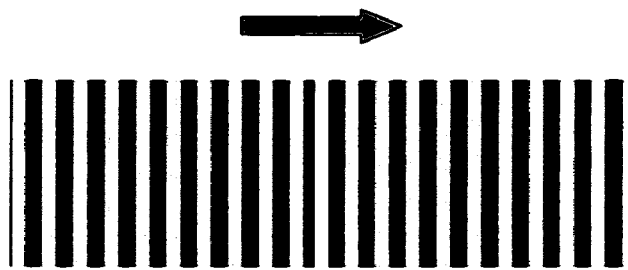
Fig. 3 - a
Fig. 3 - b  Fig. 3 - c
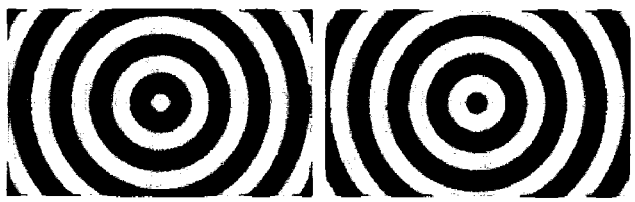
Fig. 3 - b  Fig. 3 - d
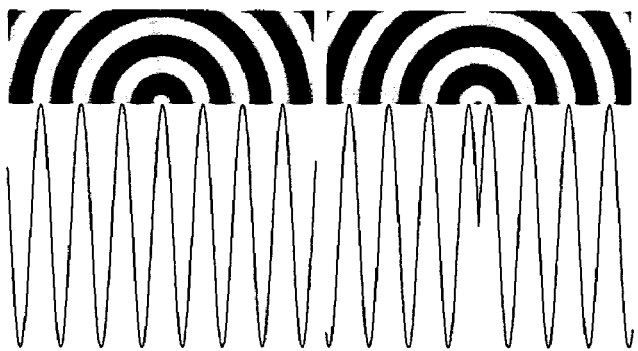
Fig. 3 - e  Fig. 3 - f

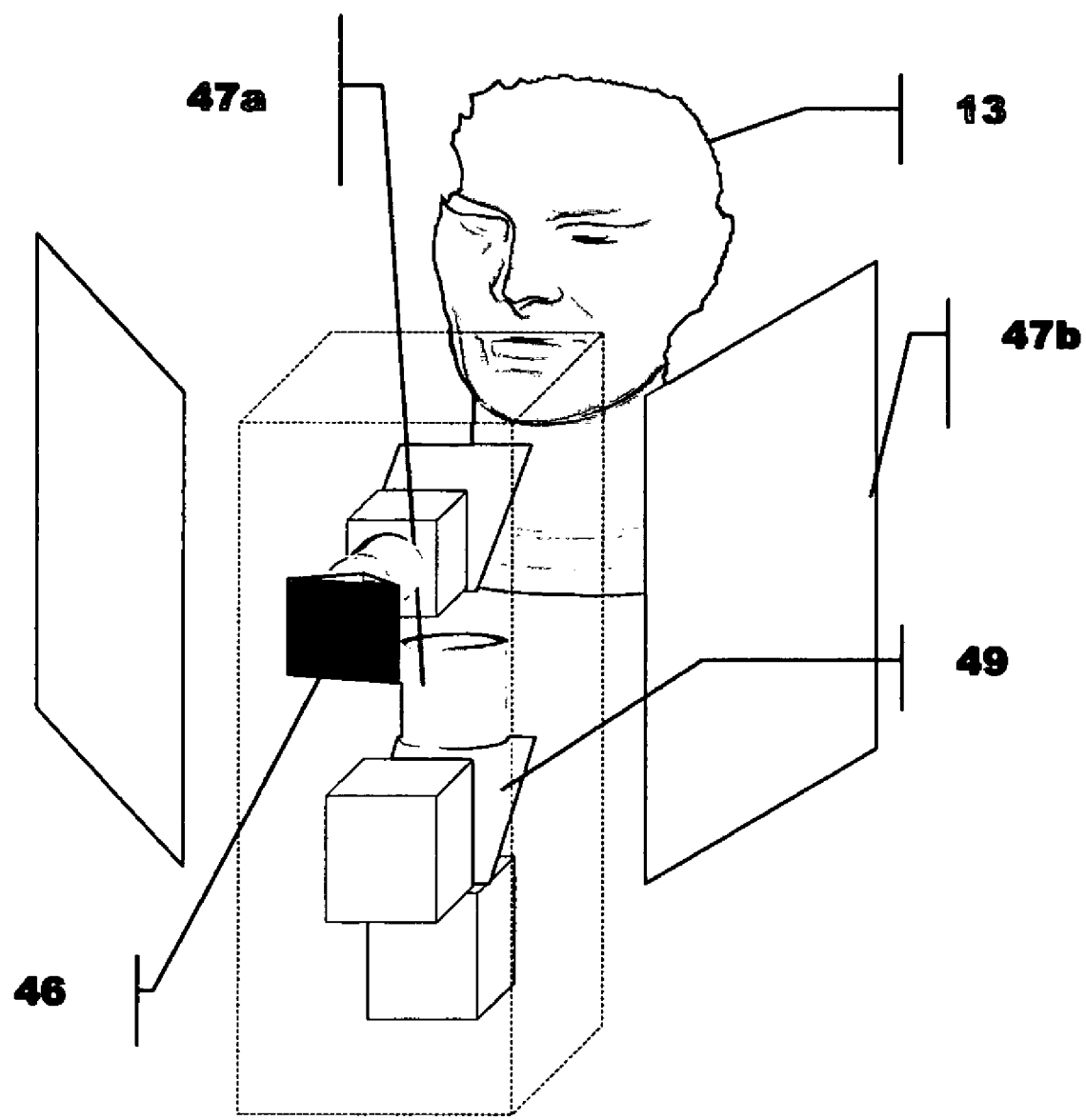
*Fig. 4 - a*

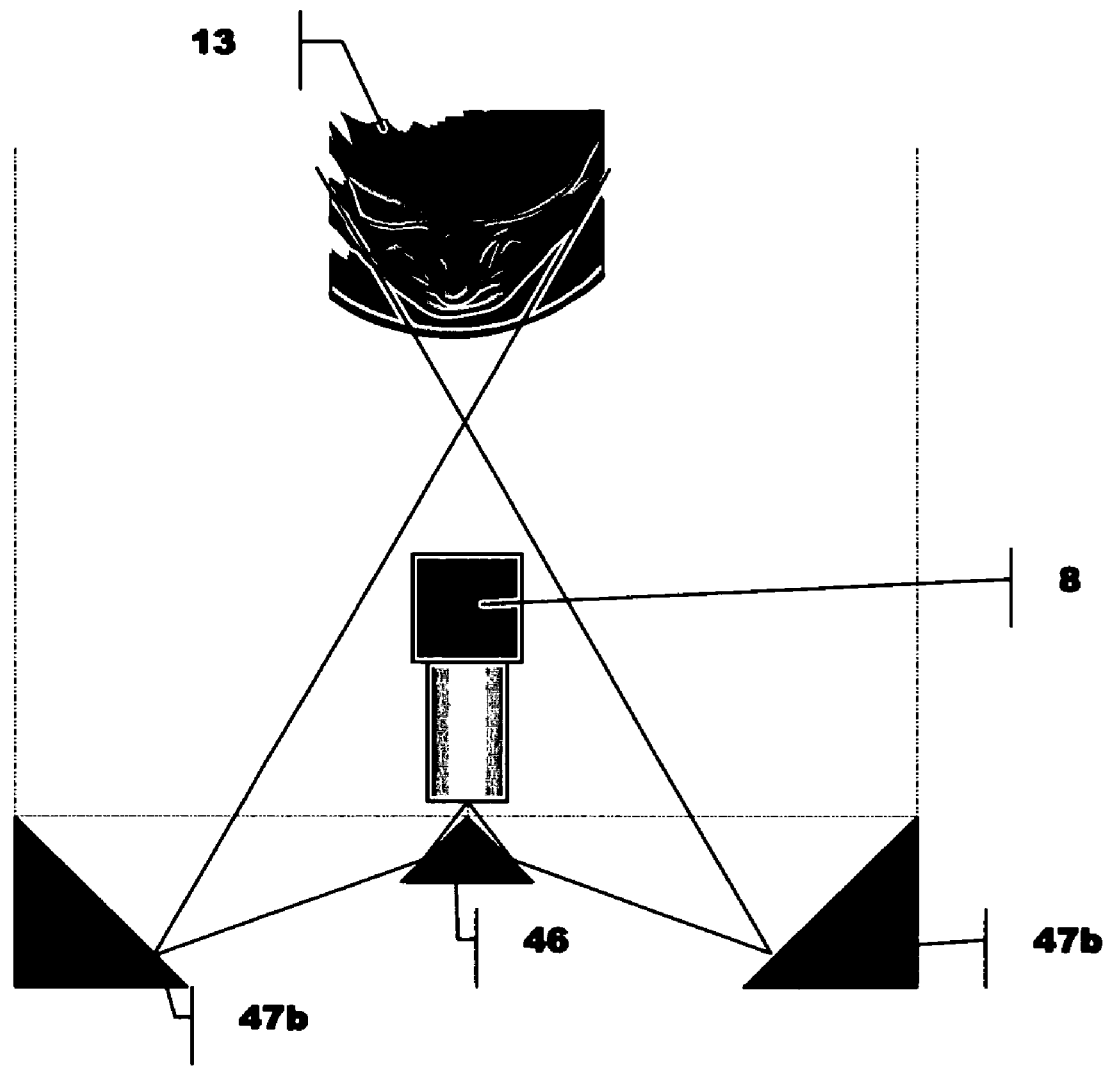
*Fig. 4 - b*

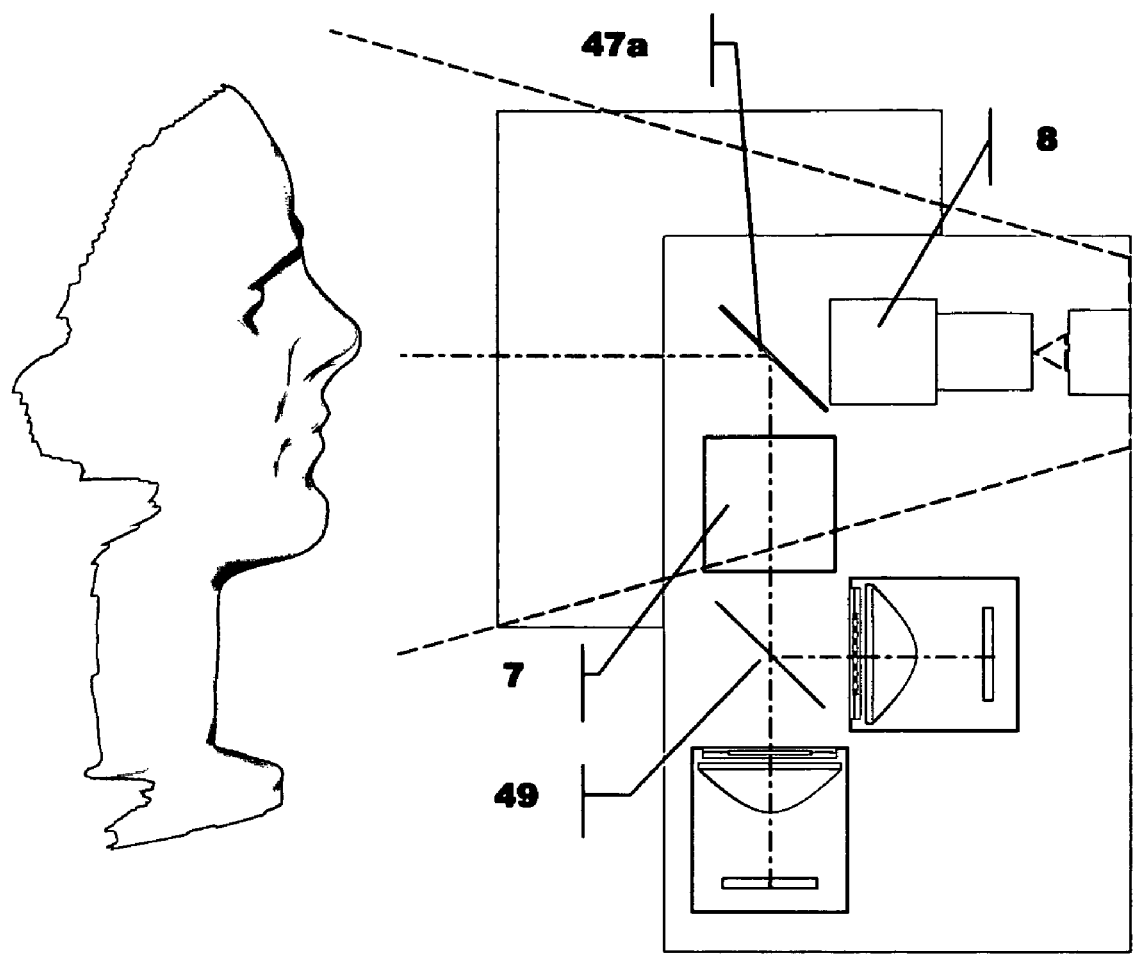
Fig. 4 - c

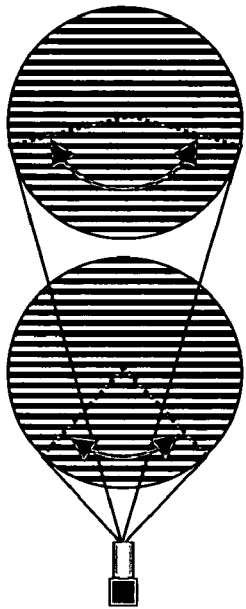
Fig. 5 - a
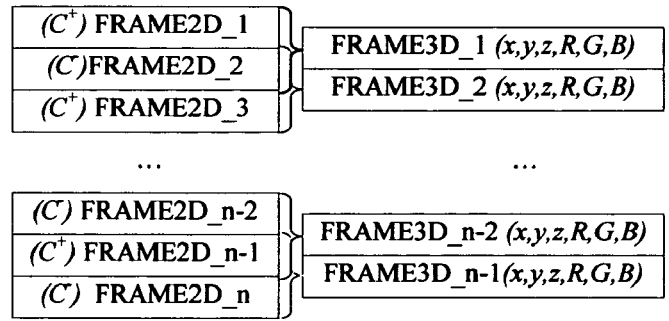
Fig. 6
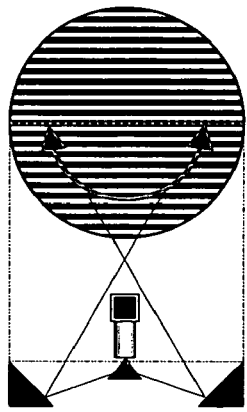
Fig. 5 - b

DEVICE FOR ACQUIRING A THREE-DIMENSIONAL VIDEO CONSTITUTED BY 3-D FRAMES WHICH CONTAIN THE SHAPE AND COLOR OF THE ACQUIRED BODY

The present invention relates to a device for acquiring, at an appropriate rate, a plurality of frames related to the three-dimensional shape and color of the surface of an object, assembled in a 3-D video.

BACKGROUND OF THE INVENTION

The background art does not have systems or apparatuses for acquiring three-dimensional videos, although a document is known which describes a system for acquiring the three-dimensional shape of a body.

Such system, disclosed in document IT 1297440, acquires the image of an object, in which emitters of a light beam project onto the surface of the object, along an optical axis and through a lens, two mutually offset images of a fringe mask. The images, reflected by the surface of the object to be acquired, are then acquired by a video camera, which sends corresponding signals to processing means. Such means, by convenient processing of the signals received from the video camera, thus determine the three-dimensional coordinates of the shape of the surface of the object and ultimately achieve a software representation of the surface of the object.

These acquisition systems use masks for blocking the light beams which are provided with straight and parallel fringes, preferably of the sinusoidal type.

In practice, a same mask is projected onto the object to be acquired in two separate positions which are offset by π. In order to achieve the software representation of the three-dimensional shape of the surface of the object, the images acquired by the video camera and sent to the computer are processed by means of computational algorithms which use a suitable function $C_{mis}$ of two signals which correspond to each of the two images, offset by π. The technique on which the processing of this function is based, i.e., projecting two images which are mutually offset images by π onto the object and calculating their difference as a measurement signal, is commonly known in the literature as "π-shift method" and was presented for the first time by Jian Li, Xian-Yu Su, Lu-Rong Guo in 1990 (Optical Eng. 29 (12)) as an improved method of the FTP method introduced by Prof. M. Takeda and Prof. S. Kobayashi in 1982.

However, this technique, starting from $C_{mis}$, allows to obtain the 3-D frame of the acquired object only minus a phase multiplication coefficient, which remains undetermined until an auxiliary condition suitable to allow its calculation occurs. In practice, this multiplication coefficient leads to an uncertainty in the distance of the object from the acquisition device or to an uncertainty in the scale coefficient of the acquired 3-D frame.

Accordingly, the acquisition system disclosed in document IT 1297440 cited above becomes actually capable of working only if this uncertainty is solved.

Although document IT 1297440 does not even mention the problem, much less a possible solution thereof, the uncertainty cited above might be solved by integrating the physical apparatus that constitutes the acquisition device with a sensor which is capable of acquiring the measurement of the position of at least one point of the object to be acquired, or by applying to the object, before it is acquired, markers which are arranged at a preset distance and which, subsequently identified on the subsequently acquired 3-D frame, allow by means of their known distance to calculate the scale coefficient to be applied to the software image of the acquired object.

Moreover, as regards light sources, the background art used flash units, which, as is known, are able to discharge a great amount of energy in fractions of a second. But, indeed for this reason, at least when the object to be acquired is a person, this type of lighting is unpleasant and most of all potentially dangerous, if one considers that the energy released by a flash unit is very high, since the part that is released in the visible range is only a fraction of the total emitted energy.

Known devices, even if they were integrated by suitable measurement techniques or means adapted to allow to overcome such uncertainty of the phase constant, would also suffer a further limitation, consisting in that they are unable to perform, with acceptable errors, the acquisition of objects arranged at a short distance from the video camera, and this limits greatly their possible applications.

In view of the above, known acquisition devices are susceptible of significant improvements which are the specific subject of the present invention.

SUMMARY OF THE INVENTION

The aim of the invention is therefore to overcome the operational limitations and drawbacks of known devices by means of the combined adoption of particular deflection means and of a particular choice of the function which manages the offset of the projected images.

Another object of the invention is to provide a device which can be used advantageously also in very confined spaces, thus allowing use in an extremely wide range of practical situations.

Another object of the invention is to provide a device which is provided with lighting units whose light emission intensity can be modulated so as to avoid traumatic dazzling effects and in any case avoid creating situations of physical discomfort and/or situations which have a potentially health risk when the object to be acquired is a person and in particular a person arranged at a short distance from the lighting devices.

Another object of the invention is to provide a compact device which has a relatively low cost and is capable of working with high accuracy even with very low-performance optical systems.

Another object of the invention is to provide a device which is capable not only of acquiring the three-dimensional shape of the surface of the object to be acquired but also of acquiring the color characteristics of such surface and of associating them exactly.

Another object of the invention is to allow scanning the shape and color at a certain rate, or to perform the acquisition of an actual three-dimensional video.

The technical characteristics of the present invention, according to these objects, can be deduced readily from the content of the appended claims, particularly from claim 1 and from any claim which is directly or indirectly dependent on claim 1.

BRIEF DESCRIPTION OF THE DRAWINGS

Moreover, the advantages of the present invention will become better apparent from the following detailed description, given with reference to the accompanying drawings, which illustrate merely exemplifying and nonlimiting embodiments thereof, wherein:

FIG. 3a is a view of two images arranged side-by-side and offset by π, of a conventional mask of the sinusoidal type, with rectilinear fringes;

FIG. 3b is a first image of a mask of the cosinusoidal type according to the invention, with curvilinear fringes;

FIG. 3c is view of a second image, constituted by the image of FIG. 3b offset by π, as it would be generated by a known type of device;

FIG. 3d is another view of FIG. 3b, with the image of FIG. 3b offset by π, as it would be generated by a device according to the invention, superimposed thereon;

FIG. 3e is a view of the upper half of FIG. 3b, i.e., of a mask of the cosinusoidal type, below which the brightness profile of the horizontal cross-section that passes through the center is plotted;

FIG. 3f is a view of the upper half of a mask of the sinusoidal type, below which the brightness profile of the horizontal cross-section that passes through the center is plotted;

FIG. 4a is a general perspective view of a variation of the invention in which images produced with fringes of the cosinusoidal type are projected, such variation being usable advantageously also with an object to be acquired which is located very close to the video camera;

FIG. 4b is a top view of the layout of FIG. 4a, with some parts removed in order to show others more clearly;

FIG. 4c is a schematic side view of FIG. 4a, shown with some parts removed for greater clarity;

FIG. 5a is a graphically explanatory diagram of the operating conditions in which an acquisition system of conventional type would work if the object to be acquired were close to such system;

FIG. 5b is a graphically descriptive diagram of the operating conditions in which an acquisition system according to the invention, shown in FIGS. 4a, 4b and 4c, works when the object to be acquired is close to the system;

FIG. 6 is a schematic view of how the 2-D video is processed in order to obtain the 3-D video.

DESCRIPTION OF THE PREFERRED EMBODIMENTS

Figure 1:
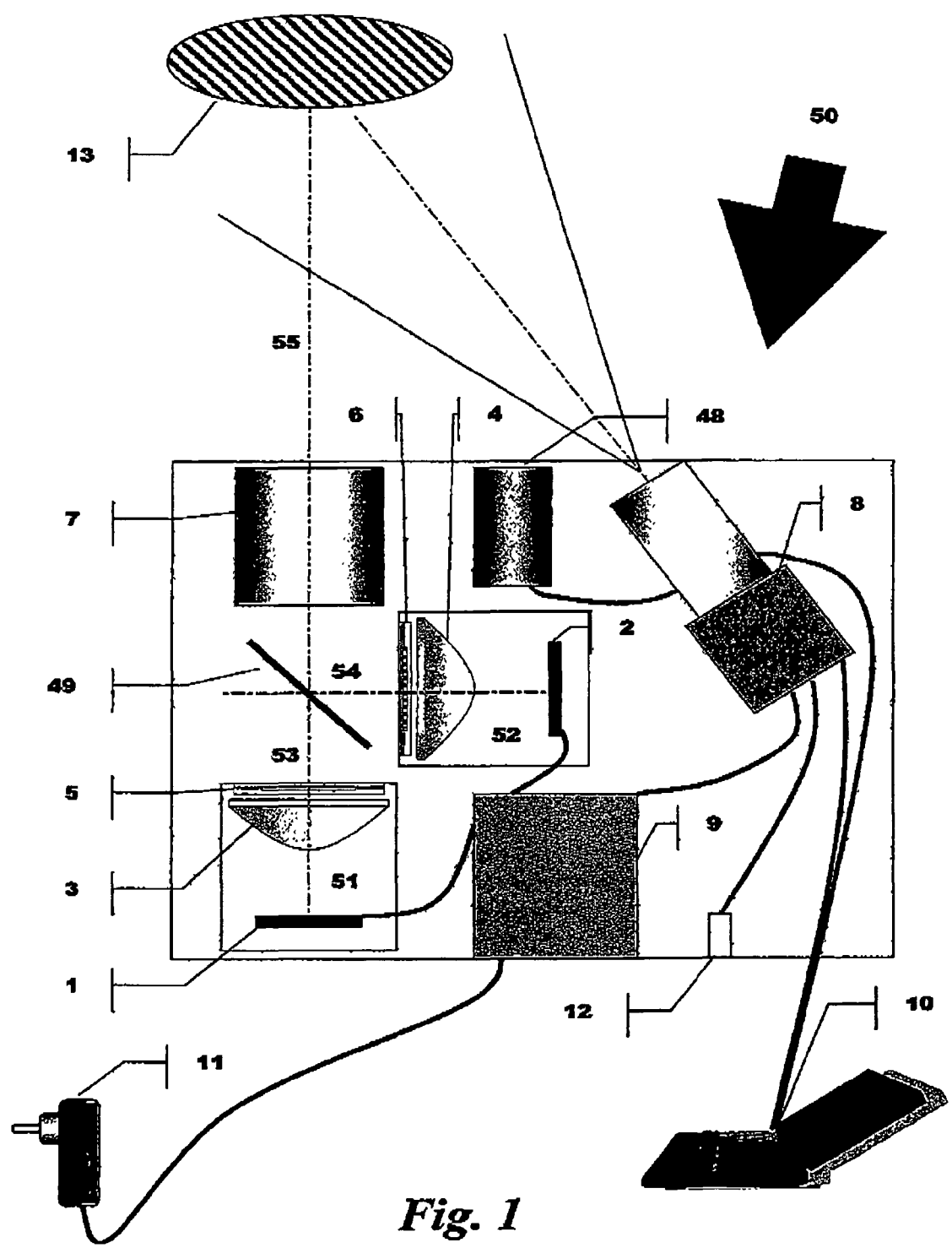
FIG. 1 is a highly schematic general view of a device according to the invention.

With reference to the figures, in FIG. 1 the reference numeral 50 generally designates a device for acquiring, at an appropriate rate, a video of the three-dimensional shape of the surface of an object 13 and of the color of such surface.

The device 50 substantially comprises two projection assemblies, generally designated by the reference numerals 51 and 52, which respectively have optical axes 53 and 54 and comprise respectively a light source 1 and 2 constituted in particular by one or more LEDs. The projection assemblies 51 and 52 further comprise at least one lens 3 and 4 for condensing the light beam that arrives from the LEDs in at least one point and a mask or masks 5 and 6 provided for example by a slide.

The device 50 further comprises at least one semireflecting means 49, also known as beam splitter. The semireflecting means 49 is capable of deflecting part of the incident light energy and of allowing itself to be crossed instead by the residual part of the total incident energy.

The optical axes 53 and 54 are incident in input on the reflecting means, and therefore the fraction of deflected energy of one of the optical axes and the fraction of the energy which instead passes through and is pertinent to the other axis continue together along a channel, designated by the reference numeral 55, toward a lens 7, which, with reference to the direction of travel of the light emitted by the light sources 1 and 2, is arranged downstream of the beam splitter 49.

The device 50 is capable of projecting, by means of the sequential and repeated lighting of the individual LEDs that compose it, at least one or more light codes onto the object 13 to be filmed in 3-D through the several channels of the beam splitter.

The device 50 further comprises image acquisition means 8 and processing means 10 which are associated therewith. The acquisition means are adapted to acquire the image of the object 13, lit by the light codes; the processing means are capable of processing said image so as to reconstruct by means of software the acquired shape of the object 13.

More particularly, the acquisition means 8, provided for example by a video camera, acquire a video which is composed of n two-dimensional frames, which are transferred to the processing means 10, which then calculate the frames of the three-dimensional video of the object 13.

More particularly, as shown in FIG. 6, once a video composed of n 2-D frames (frame_i, with i=1−n) has been acquired, for each i=1, 2, . . . n−1, frame_i and frame_i+1 are processed and contain the object 13 on which the two images of the positive cosinusoidal type ($C^+$) and negative cosinusoidal type ($C^-$) are projected, from which the measurement signal $C_{mis}$ is extracted by means of the formula $C_{mis}=C^+-C^-$ and the color characterization signal is extracted by means of the formula $C_{RGB}=C^++C^-$.

Figure 2:
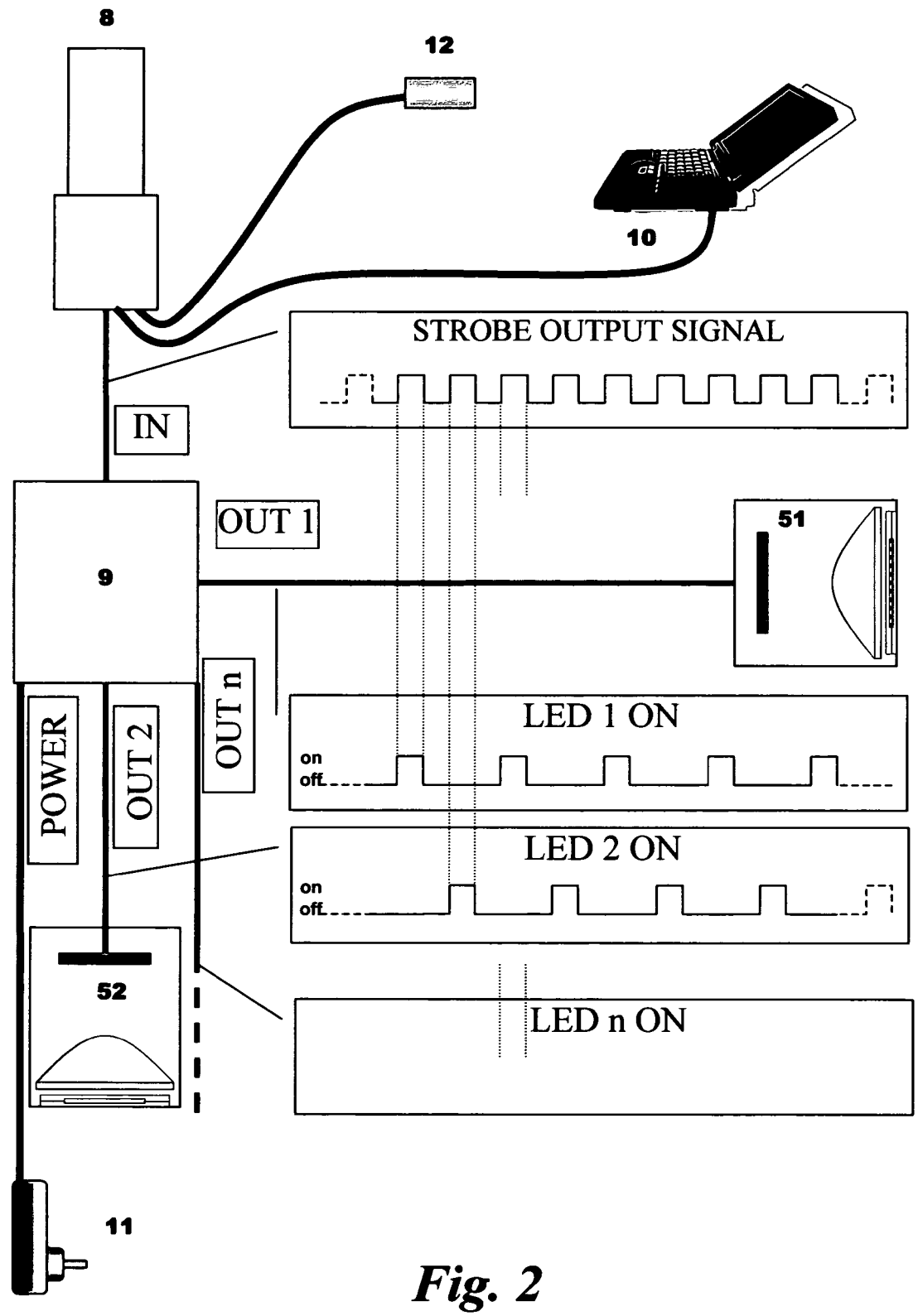
FIG. 2 is a schematic general view of a constructive variation of the device of FIG. 1, which is further provided with a plurality of light sources and is equipped with an electronic board for driving the device.

In this manner, starting from n 2-D frames, one obtains n−1 3-D frames. The LEDs, which provide the light sources 1 and 2, are driven by driver means 9 which receive as input a "strobe output" signal of the video camera and emit in output a signal for the alternated lighting of the LEDs synchronously with respect to the input signal. FIG. 2 shows that the driver means 9 take an input synchronization signal for the acquisition of the frames of the video camera 8 and correspondingly turn on in a cyclic ordered sequence the light sources 1 and 2 of the device 50.

In the example being described, reference is made for the sake of simplicity to just two projection assemblies 51 and 52. Their number, however, can also be higher, as clearly shown by said FIG. 2.

The driver means 9 also comprise a socket 12 which is designed to receive in input a synchronization signal which is adapted to allow the device 50 to be driven also as a function of, and synchronously with, external events.

The device 50 may further comprise at least one second additional sensor 48, which can be associated with the processing means 10 and can, if one wishes, acquire the position of at least one point of the object 13 synchronously with the frame acquisition of the video camera 8. As will become better apparent from the continuation of the description, such a position sensor 48 is not strictly necessary; its presence, however, can be advantageous for auxiliary checks of the functionality of the device 50, such as checking the presence of the object within the calibration volume.

As already mentioned, the frames are generated starting from the projection onto the object 13 of two images of the masks 5 and 6 respectively: of the positive cosinusoidal type $C^+$ and of the negative cosinusoidal type $C^-$.

From the acquired frames, the processing means 10 then extract a measurement signal $C_{mis}$ and a signal for chromatic (color) characterization of the surface of said object 13, also known as texture. These signals are calculated by means of the following formula:

$$C_{mis} = C^+ - C^-$$

$$C_{RGB} = C^+ + C^-$$

At this point, however, taking into account the problem of the uncertainty of the phase constant linked to the method known as "π-shift method" referenced earlier, and depending on the type of fringe projected by the masks 5 and 6, the device 50 can operate at least according to two different fundamental conditions, which are described hereinafter merely by way of non-limiting example.

A first possible operating condition can use fringes of the cosinusoidal type, which are curvilinear and symmetrical.

More particularly, it should be noted that the method disclosed by document IT 1297440, based on the displacement of the origin of the light source, works very well with the projection of fringes with rectilinear patterns. In this case, shown in FIG. 3a, it can be seen in fact that the two left and right images can be distinguished perfectly and are representative of each other with an offset of π, but this does not work at all with fringes having a circular nature, since the offset is no longer obtained by translation of the projected grid but by projecting two grids, one of which is the negative of the other. This definition of π-shift, which is part of the invention, is more general. Moreover, in this known device, in order to solve the problem of the calculation uncertainty of the phase multiplication constant, it is inevitably necessary to introduce an additional condition which, as mentioned, relates to the measurement of at least one point of the surface of the acquired object 13 or relates to the distance of two known points of the surface of the object 13. On the contrary, in the case of the device 50 according to the present invention, the combination of a circular or curvilinear fringe with the beam splitter 49 allows to solve completely the problem of phase constant uncertainty. As shown by FIGS. 3b and 3d, it can be seen in fact that the combination of beam splitter 49 and of circular fringes allows to generate and project two images which are truly a negative of each other. However, the use of circular cosinusoidal fringes which are symmetrical with respect to the center still allows to apply the π-shift method (taking of course into account the changes to the calculation of phase quadrature, as explained by Kieran G. Larkin in his article "*Natural Demodulation of 2D Fringe Pattern*" and subsequent articles), allowing however to solve phase uncertainty.

The combination of the beam splitter 49 with masks 5 and 6 which have a curvilinear fringe provided with an image center or in any case with a characteristic point having a known position allows, indeed by utilizing the geometric properties of the image and the triangulation principle, to determine unequivocally the position of at least one point of the body which, on the image plane of the acquisition means, is shifted with respect to the corresponding point of the mask. In this manner, the condition of uncertainty is solved in merely computational terms, i.e., by means of software, without requiring the use of additional external physical devices such as sensors or markers to be placed on the object 13 to be acquired in order to point out characteristic points thereof needed for subsequent determinations.

If the characteristic point is not detectable (for example because it is not projected onto the object), the base of the triangulation can be found by resorting to the disparity map of the curvatures of the reference fringes and of the fringes reflected by the object.

Finally, it is noted that in the case of curvilinear fringes which are symmetrical with respect to the center the sine function proposed by the background art would not yield accurate results: since sine is an odd function, it would have a cusp at the center of the symmetry—FIG. 3f—which leads to an error, which is defined by a two-dimensional Bessel curve, which is particularly evident in the point being considered. On the contrary, the cosine function introduced by the present invention, being even or, in other words, symmetrical with respect to the axis of the ordinates, has no discontinuities—FIG. 3e—and therefore no associated error.

The second possible operating mode of the device 50 can be performed by using rectilinear and cosinusoidal fringes with a beam splitter 49 combined with mirrors 47a and 47b.

The diagram of FIG. 4a is a general perspective view of such a setup.

In practice, the device 50 works on a vertical plane which passes through the centerline of the object 13 (FIG. 4c) in the same manner described earlier. The only difference that can be observed in this case—with respect to the diagram of FIG. 1—is determined by the fact that in the diagram of FIG. 4c there is a mirror 47a which is arranged after the lens 7 and in front of the video camera 8 and is adapted to deflect the channel 55 and reflect it onto the object 13.

As regards viewing the object 13 on a horizontal plane (FIG. 4b), the device 50 directs the lens of the video camera in the opposite direction with respect to the direct direction for acquiring the object 13 and then conveys the images of the object 13 to the video camera 8 indirectly and by means of an optical reflective prism 46 which has two faces at 45° and is arranged in front of the video camera 8 and on which the images of the object 13 to be acquired converge, said images being instead reflected by two mirrors 47b which are inclined at 45° and are conveniently arranged bilaterally adjacent to the optical reflective prism 46.

Such a solution allows the video camera 8 to have a complete and correct view of the object 13 even within a relatively confined space, such as for example the interior of a revolving entrance door of a bank.

The reference to this example of application once again clearly shows the advantage of having low-energy light sources which can be managed so that they are not intolerably dazzling, as indeed occurs with LEDs.

Further advantages of such a second operational setup of the device 50 can also be understood with the aid of FIGS. 5a and 5b, optionally compared with each other.

If one observes FIG. 5a, it can in fact be seen that if one wishes the possibility to acquire an object in extremely small spaces it is of course possible to use wide-angle lenses to acquire the object at close range. However, as is evident from the graphical representation, the increase in the acquisition angle of the video camera 8 also causes a corresponding reduction in the extent of the surface of the object 13 that is actually within the viewing field of the video camera 8. Moreover, it is also noted that the arrangement of the object 13 close to the video camera 8 also increases the obliqueness of the optical rays. This greatly diversifies the surface acquisition conditions depending on whether they have a concave or convex shape: this also causes accuracy errors which increase as the obliqueness of the optical rays increases.

The configuration of the device 50 according to the invention shown instead in FIG. 5b instead clearly shows that in this case, even for extremely short distances, a measurement angle of 180° continues to be assured. Moreover, thanks to the particular geometry of the mirrors 47b, the optical axis of the video camera 8 is divided into two axes which, at the very limits of the viewing field, the mirrors reflect with a substantially parallel arrangement. This allows to acquire concave or convex surfaces in equally satisfactory conditions regardless of the type of surface.

As regards the problem of phase constant uncertainty, it can be easily overcome in this case also. The device 50 in fact allows the video camera 8 to actually acquire two half-images, which therefore allow to calculate the phase constant. In other words, the video camera 8, the optical reflective prism 46 and the mirrors 47b are in practice equivalent to two virtual video cameras which acquire the image with triangulation of two half-images. However, despite this functional equivalence, the device 50 is considerably less expensive than a solution which instead actually were to use two real video cameras 8.

As regards the practical construction of the semireflecting means, i.e., the beam splitter 49, there are many technologically possible alternatives. Among the various possibilities, one exemplifying embodiment of a said semireflective means can be obtained by means of a simple coating, i.e., by means of a treatment placed on a film or glass sheet which, if arranged at 45° with respect to the incident beam, is capable of making part of the energy filter through and of reflecting the remaining part.

Moreover, another advantage, with respect to the option of adopting wide-angle lenses to acquire objects 13 located close to the acquisition means 8, which can be ascribed in particular to the second embodiment of the device 50 described here, is the possibility to project linear fringes in the solution with a beam splitter 49 and a mirror when using low-quality lenses.

Low-quality lenses in fact have the prerogative of being much brighter at the center than at the edges of the image (vignetting).

The acquisition device 50 according to the invention, which projects at least two distinct masks 5 and 6, allows however to compensate for this phenomenon with a suitable variation of the mean value of the slide to be projected in order to compensate for this brightness gradient.

It is evident that if one were to work by only moving a single fringe (IT1297440), one would also achieve the displacement of the mean compensation value, which on the contrary one needs to keep fixed and centered with respect to the optical axis of the lens.

As regards the additional advantages offered by LED light sources, it should also be noted that such sources, by being able to provide a highly concentrated light beam, allow to have rather compact lenses 7. Moreover, to the advantage of LEDs one cannot ignore the electrical safety aspects, since they operate at low voltages (24V) in contrast with the much higher trigger voltages of flash units, which are notoriously on the order of several thousand volts.

The invention thus conceived is susceptible of evident industrial application and it can also be the subject of numerous modifications and variations, all of which are within the scope of the appended claims; all the details may further be replaced with technically equivalent elements.

Merely by way of example, a variation of embodiment of the masks can be constituted advantageously by the use, in combination with a single light source, of a single condenser, of a single mask provided with liquid crystals of the TN type. Liquid crystals can in fact assume the shape of the two complementary masks and can be switched on alternately and synchronously with respect to the acquisition of the frames. The electronic units will merely control the switch-on of the liquid crystals as described above and activate the light source again synchronously with the exposure of the frames.

It should be noted that the device must be integrated by a suitable frequency filter arranged in front of the lens 7, adapted to modify the image projected by the LCD mask from a sawtooth waveform to a waveform which is of the almost cosinusoidal type.

The disclosures in Italian Patent Application No. BO2006A000421 from which this application claims priority are incorporated herein by reference.

Where technical features mentioned in any claim are followed by reference signs, those reference signs have been included for the sole purpose of increasing the intelligibility of the claims and accordingly such reference signs do not have any limiting effect on the interpretation of each element identified by way of example by such reference signs.

What is claimed is:

1. A device for acquiring the three-dimensional shape of the surface of an object, comprising a lens; deflection means; at least one mask; at least one projection assembly adapted to emit light beams which, by passing through the masks, the deflection means and by traveling along a channel which passes through the lens, strike the object to be acquired, projecting onto it mutually offset images of the masks; means for acquiring the images reflected by the object; and means for processing the reflected images; wherein said deflection means is semireflecting and said masks are adapted to project fringe images of the cosinusoidal type through said deflection means.

2. The device according to claim 1, wherein said fringe images are curvilinear.

3. The device according to claim 2, wherein said curvilinear fringes are circular.

4. The device according to claim 1, wherein said fringes are rectilinear and parallel.

5. The device according to claim 1, wherein said deflection means is a semireflecting means, which is adapted to divert part of the light energy that is incident thereon and to allow the residual part of said energy to pass through it.

6. The device according to claim 1, wherein said one or each projection assembly includes at least one LED light source.

7. The device according to claim 6, wherein said light sources are driven by driver means which receive as input a "strobe output" signal of the acquisition means and emit in output a signal for the activation, synchronously with the input signal, of the light sources according to a sequence which is preset in an ordered manner.

8. The device according to claim 1, further comprising a plurality of projection assemblies and a plurality of corresponding masks which are adapted to project sequentially, at a pre-determined rate, a series of images, each offset with respect to the preceding one, said acquisition means and said processing means respectively acquiring and providing in output a video of said object.

9. The device according to claim 8, further comprising at least one socket which is functionally associated with the processing means and is adapted to receive in input a synchronization signal which is correlated to an event which is external to said device.

10. The device according to claim 8, wherein said video relates to the three-dimensional shape and the color associated with the points of said shape.

11. The device according to claim 1, wherein said one or each mask is of the type with rectilinear fringes, and comprising optical means which are adapted to allow the acquisition, with a single acquisition means, of two half-images of a said object to be acquired.

12. The device according to claim 11, wherein said optical means include at least one mirror which is arranged after the lens and is interposed with respect to said image and said acquisition means, said mirror being adapted to deflect the channel that passes through said lens and then reflect it onto the object to be acquired.

13. The device according to claim 11, wherein said acquisition means includes a video camera which is pointed away from the object, said optical means including an optical prism which is arranged in front of the video camera and two mirrors which are arranged side by side and bilaterally with respect to the prism, said optical means being adapted to divide the optical axis of the video camera in a manner adapted to acquire two half-images of said object to be acquired.

14. The device according to claim 13, wherein said optical prism and said mirrors have reflective surfaces which are inclined substantially at 45° with respect to said optical axis of the video camera.

15. The device according to claim 1, wherein the acquisition of the video of said object includes the acquisition of n two-dimensional i-frames, with i variable from 1 to n−1, and includes the subsequent processing of an i-frame and of an i+1-frame of the object on which two images of the positive cosinusoidal type and of the negative cosinusoidal type are projected, a measurement signal $C_{mis}$ being determined with the formula $C_{mis}=C^+ - C^-$, a signal for color characterization of the surface of said object being determined by means of the formula $C_{RGB}=C^+ + C^-$.

16. The device according to claim 1, wherein said one or each mask includes liquid crystals which are adapted to assume the shape of the two complementary images to be projected.

17. The device according to claim 16, wherein said device comprises a frequency filter which is arranged in front of the lens and is adapted to modify the image projected by the LCD mask from a sawtooth waveform to one which is of the almost cosinusoidal type.

18. The device according to claim 1, wherein said fringe images are negatives of each other.

\* \* \* \* \*